US012234973B2

(12) United States Patent
Nemec et al.

(10) Patent No.: US 12,234,973 B2
(45) Date of Patent: Feb. 25, 2025

(54) BEAM CONTROL SYSTEM FOR AN AUTOMATED LUMINAIRE

(71) Applicant: ROBE lighting s.r.o., Roznov pod Radhostem (CZ)

(72) Inventors: Petr Nemec, Krhova (CZ); Jan Vilem, Valasske Mezirici (CZ); Jaroslav Pavlicek, Zubri (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/640,958

(22) Filed: Apr. 19, 2024

(65) Prior Publication Data
US 2024/0263770 A1    Aug. 8, 2024

Related U.S. Application Data

(60) Provisional application No. 63/497,599, filed on Apr. 21, 2023.

(51) Int. Cl.
*F21V 21/30* (2006.01)
*F21V 5/00* (2018.01)
(Continued)

(52) U.S. Cl.
CPC .............. *F21V 21/30* (2013.01); *F21V 5/007* (2013.01); *F21V 5/08* (2013.01); *F21V 14/02* (2013.01);
(Continued)

(58) Field of Classification Search
CPC ............ F21V 14/02; F21V 5/007; F21V 5/08; F21V 21/30; F21V 17/02; F21V 14/06;
(Continued)

(56) References Cited

U.S. PATENT DOCUMENTS

| 6,220,731 B1 * | 4/2001 | Ryan | F21V 29/74 |
| | | | 362/306 |
| 2007/0236950 A1 * | 10/2007 | Stefanov | F21S 41/265 |
| | | | 362/496 |

(Continued)

FOREIGN PATENT DOCUMENTS

| CN | 110177974 A * | 8/2019 | ............. F21V 5/007 |
| DE | 202005021061 U1 * | 3/2007 | ......... F21S 48/1154 |

(Continued)

OTHER PUBLICATIONS

European Extended Search Report; Application No. 24171504.4; Oct. 9, 2024; 11 pages.

*Primary Examiner* — Erin Kryukova
(74) *Attorney, Agent, or Firm* — Conley Rose, P.C.; Brooks W Taylor (57) ABSTRACT

A luminaire includes a light emitter, an asymmetric lens, and a mechanism. The light emitter includes an exit aperture and emits a light beam having an optical axis. The asymmetric lens receives the light beam and projects a projected beam. The mechanism rotates the light emitter about an axis of rotation passing through the exit aperture, thereby moving a point of entry of the light beam into the asymmetric lens. A size and location of a hot-spot of the projected beam varies as the point of entry of the light beam into the asymmetric lens moves. The asymmetric lens includes a long axis, a short axis, and an asymmetric surface, which has a long axis parallel to the long axis of the asymmetric lens. The asymmetric surface is asymmetric in a cross-section taken in a plane perpendicular to the short axis of the asymmetric lens.

19 Claims, 11 Drawing Sheets

(51) Int. Cl.
  *F21V 5/08* (2006.01)
  *F21V 14/02* (2006.01)
  *F21Y 103/10* (2016.01)
  *F21Y 113/00* (2016.01)

(52) U.S. Cl.
  CPC ....... *F21Y 2103/10* (2016.08); *F21Y 2113/00* (2013.01)

(58) Field of Classification Search
  CPC ...... F21V 14/065; F21V 5/04; F21Y 2103/10; F21Y 2113/00; F21W 2131/406; F21W 2131/105; G02B 3/005; G02B 3/08; G02B 27/0955; G02B 27/0961; F21S 41/26
  See application file for complete search history.

(56) References Cited

U.S. PATENT DOCUMENTS

| | | | |
|---|---|---|---|
| 2013/0051030 A1* | 2/2013 | Lee | F21V 5/04 362/332 |
| 2018/0245776 A1* | 8/2018 | Gladden | F21V 14/02 |
| 2020/0132278 A1* | 4/2020 | Portinga | F21V 15/01 |
| 2021/0231308 A1* | 7/2021 | He | F21V 5/048 |

FOREIGN PATENT DOCUMENTS

| | | | | |
|---|---|---|---|---|
| DE | 202020105140 U1 * | 12/2020 | | F21S 10/00 |
| WO | 2018134711 A1 | 7/2018 | | |

\* cited by examiner

BEAM CONTROL SYSTEM FOR AN AUTOMATED LUMINAIRE

CROSS-REFERENCE TO RELATED APPLICATIONS

This patent application claims the benefit of U.S. Provisional Application No. 63/497,599, filed Apr. 21, 2023, entitled "BEAM CONTROL SYSTEM FOR AN AUTOMATED LUMINAIRE" which is hereby incorporated by reference in its entirety.

TECHNICAL FIELD OF THE DISCLOSURE

The disclosure generally relates to luminaires, and more specifically to a beam control system for a cyclorama stage luminaire.

BACKGROUND

Luminaires referred to as cyclorama lights are used in the entertainment and architectural lighting markets. Such luminaires may be used in theatres, television studios, concerts, theme parks, night clubs, and other venues. A cyclorama luminaire may be used to illuminate a back-cloth or cyclorama from either a floor mounted position or from a hanging position at the top of the back-cloth or cyclorama. Some such luminaires use an asymmetric beam distribution so as to provide an approximately even level of illumination from top to bottom of the back-cloth or cyclorama. Such a luminaire may use multiple colors of light emitters, whose brightness may be controlled to vary a color and/or intensity of the emitted light.

SUMMARY

A luminaire includes a light emitter, an asymmetric lens, and a mechanism. The light emitter includes an exit aperture and is configured to emit a light beam having an optical axis. The asymmetric lens is configured to receive the light beam and emit a projected beam. The mechanism is configured to rotate the light emitter about an axis of rotation passing through the exit aperture, thereby moving a point of entry of the light beam into the asymmetric lens. A size and location of a hot-spot of the projected beam varies as the point of entry of the light beam into the asymmetric lens moves.

An asymmetric lens includes a long axis, a short axis, and an asymmetric surface. The asymmetric surface includes a long axis parallel to the long axis of the asymmetric lens. The asymmetric surface is asymmetric in a cross-section taken in a plane perpendicular to the short axis of the asymmetric lens.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

Luminaires used to provide lighting for back-cloths, cycloramas, or other scenery may be used on a stage, in a studio, or in theatrical, film, and TV productions. With the lighting technology available before the introduction of solid-state light sources such as light-emitting diodes (LEDs), such luminaires were often large, bulky fixtures that were hot and conspicuous. Such luminaires had limited, if any, control of the light emitted from the luminaire and instead relied upon manual adjustment of their positioning to achieve a desired illumination of the surface being lit. After initial set-up no further beam control was possible.

Such technical problems are solved by luminaires according to the disclosure, which comprise LEDs that produce light with less heat and more efficient use of electrical power from a small source whose emitted light can be modified by lenses and other optical devices. Further, luminaires according to the disclosure have an adjustment system for the position of the light source within the fixture that allows local or remote control of a shape and/or positioning of an emitted light beam.

An additional technical problem encountered in a stage or other acting area concerns the management of cables laid around the edges of the stage. Cables are considered unsightly, they can be damaged by shoes or by wheels of set pieces or equipment such as forklifts, and they can roll when stepped on, causing a performer or stagehand to fall. Such technical problems are solved by luminaires according to the disclosure, which provides methods for holding cables so as to provide more secure footing and greater protection from damage.

Luminaires according to the disclosure are configured to be installed adjacent to each other in continuous runs across a stage, to provide adjustable control of light beam shape and positioning, and to provide a cable cavity to hold electrical power and control cabling.

Figure 1:
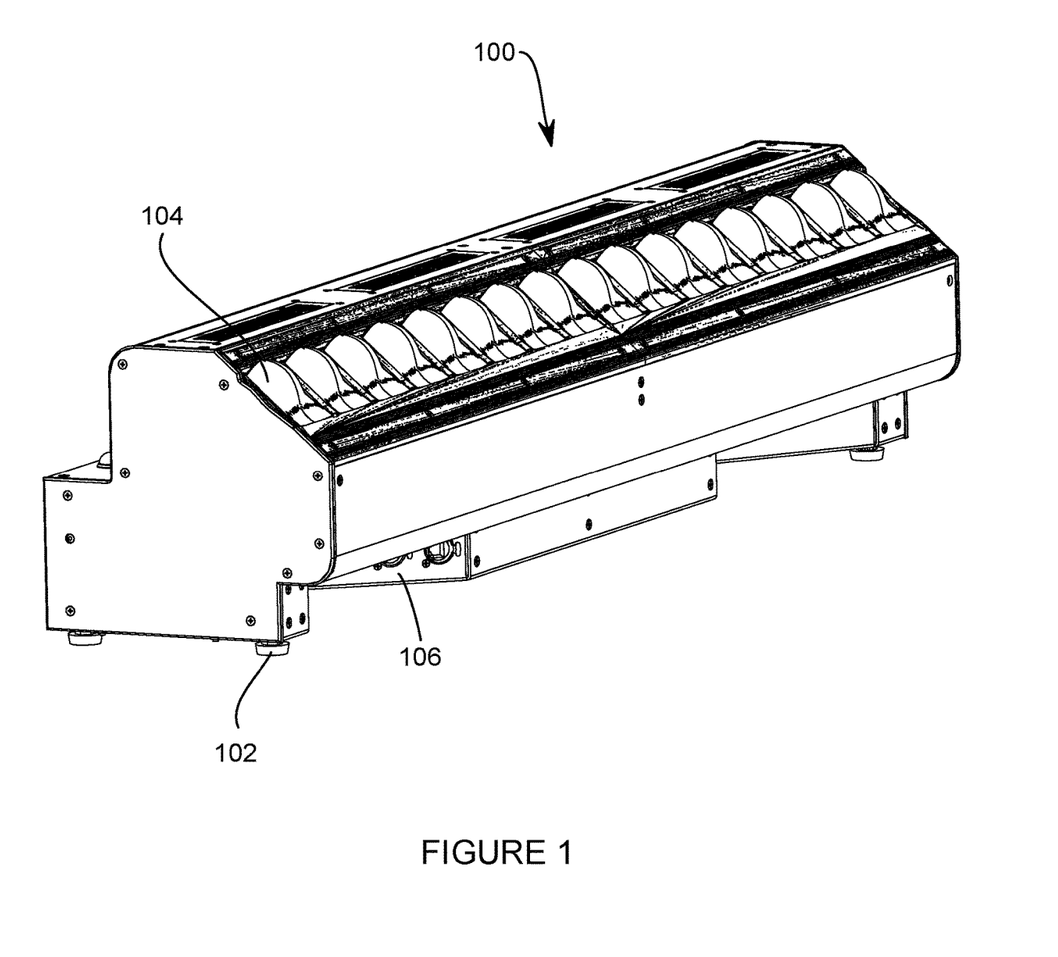
FIG. 1 presents a first orthogonal view of a luminaire according to the disclosure.
Figure 2:
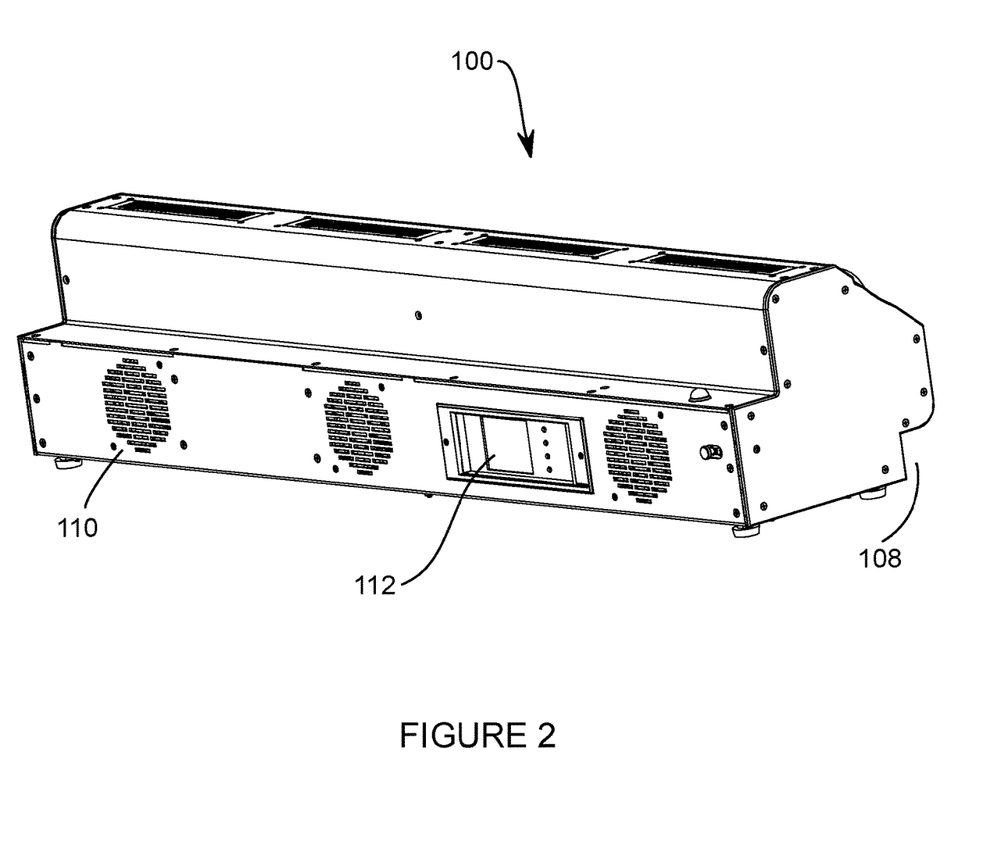
FIG. 2 presents a second orthogonal view of the luminaire of FIG. 1.

FIG. 1 presents a first orthogonal view of a luminaire 100 according to the disclosure. FIG. 2 presents a second orthogonal view of the luminaire 100 of FIG. 1. The luminaire 100 includes a plurality of asymmetric lenses 104, each of which has an associated light emitter (not visible in FIGS. 1 and 2). The luminaire 100 comprises an elongated housing having a long axis (or 'length'). Some or all of the light emitters may include one or more LEDs in one or more colors. Some or all of the light emitters may include optical systems such as reflectors, total internal reflection (TIR) light guides, lenses, or other optical devices in order to control and direct the light from the LEDs and direct it through the associated asymmetric lens 104. The asymmetric lenses 104 are arranged adjacent to each other in a single row extending in the direction of the length of the luminaire 100. In other embodiments, the light emitters may be arranged in two or more rows. In various embodiments, other numbers and/or spacings between the asymmetric lenses 104 may be used.

A bottom side of the luminaire 100 includes a plurality of feet 102 and one or more recesses 106 comprising connectors for power and data. The recesses 106 are configured to allow cables coupling two or more adjacent luminaires 100 to be connected while the luminaires 100 are spaced apart and then concealed within the recesses 106 when the luminaires 100 are placed adjacent to or physically coupled to each other. A base of the luminaire 100 includes a second recess 108 configured to allow a clear passage for cables coupling adjacent luminaires 100. The luminaire 100 includes ventilation slots 110 and a user accessible menu and control panel 112.

Figure 3:
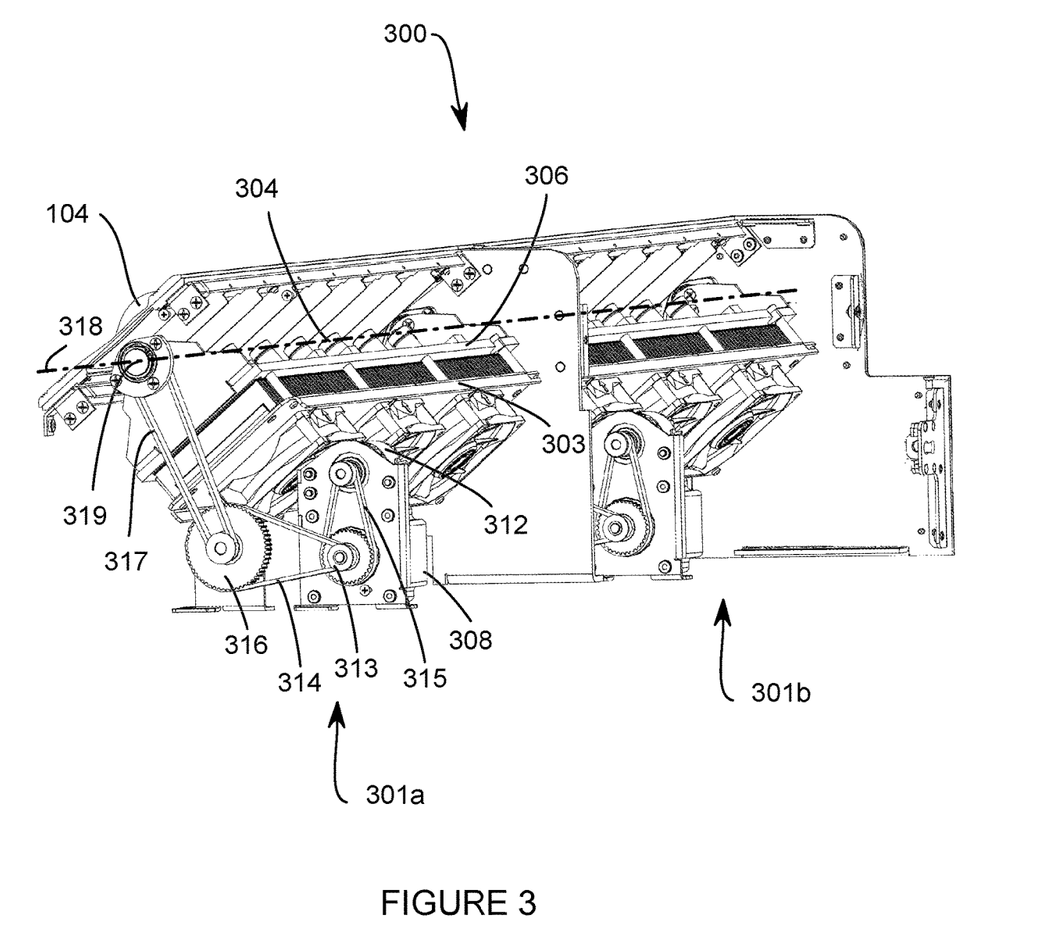
FIGS. 3 and 4 present orthogonal views of internal components of the luminaire of FIG. 1, comprising light emitter assemblies in a first position and a second position, respectively.
Figure 4:
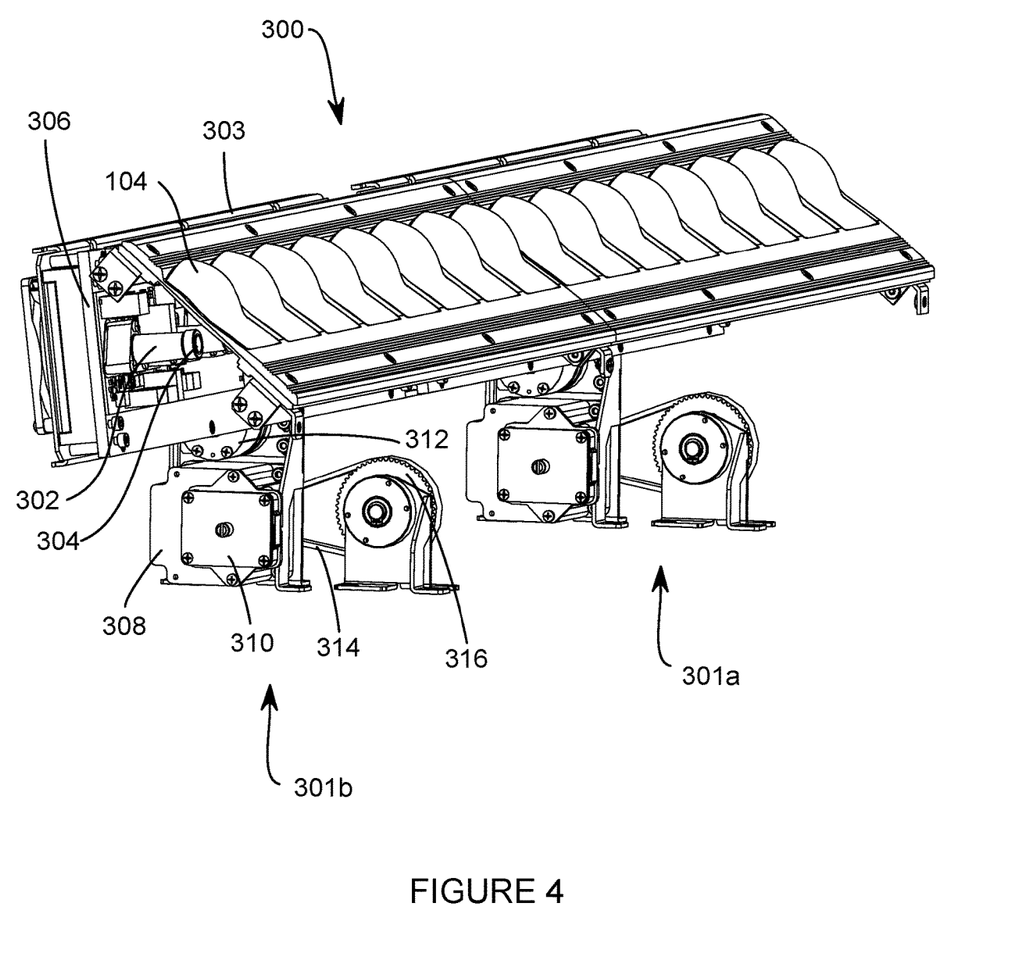

FIGS. 3 and 4 present orthogonal views of internal components of the luminaire 100 of FIG. 1, comprising an internal assembly 300 according to the disclosure. The internal assembly 300 comprises light emitter assemblies 301a and 301b. In FIG. 3, the light emitter assemblies 301a and 301b are in a first position and, in FIG. 4, the light emitter assemblies 301a and 301b are in a second position. The light emitter assemblies 301a and 301b are identical and independently controllable by control signals received via the data connector discussed above. The light emitter assembly 301a is described below.

The light emitter assembly 301a includes a plurality of the asymmetric lenses 104, each of which is optically coupled to an associated light emitter 302 that emits light through an exit aperture 304. The light emitters 302 are mounted on a circuit board 306, which is mounted to a light source assembly 303. The light emitters 302 emit a light beam having an optical axis. In some embodiments, the light emitters 302 comprise a light pipe mounted above one or more LEDs. The light pipe is configured to homogenize and direct light emitted by the LEDs. In various embodiments, the light pipe includes a lens, a filter, or other optical device at the exit aperture 304 to emit the light beam toward the asymmetric lens 104 associated with the light emitter 302.

In various embodiments, the light emitters 302 may include one or more individual LEDs or other light emitting devices. The light emitters 302 are independently controllable by control signals received via the data connector discussed above. Where the light emitter 302 includes a plurality of LEDs, the LEDs may emit light in the same or multiple colors. In some embodiments the colors of the LEDs are red, green, blue, and white. In other embodiments, any combination of LED colors may be used, e.g., red, green, blue, amber, lime, dark blue, and/or cyan. In yet other embodiments, any combination of colored and/or white LEDs may be used. Examples of such other combinations include any combination of two or more of red, green, blue, amber, warm white, cold white, or tunable white mix. In embodiments where the light emitter 302 comprises multiple colors and/or white LEDs, a color of the light emitted by the light emitter 302 may be independently controllable by control signals received via the data connector discussed above. The light source assembly 303 further comprises heat sinks, fans and other components configured for operation of the light emitters 302.

The light source assembly 303 is a mechanism rotatably mounted for rotation about an axis of rotation 318 that passes through the center of a pivot point 319. The axis of rotation 318 extends along the length of the luminaire 100, passing through the exit apertures 304. Where the exit aperture 304 is a lens or other optical device, the axis of rotation 318 may pass through any part of the optical device. In various embodiments, the axis of rotation 318 may pass through a point along the optical axis of light emitter 302 that acts as a virtual source point for the light emitted and thus as an exit aperture. Thus, when the light source assembly 303 rotates around the axis of rotation 318, each light emitter 302 mounted on the circuit board 306 rotates around its exit aperture 304.

As such, a distance of each exit aperture 304 from its associated asymmetric lens 104 remains substantially unchanged while the angle of rotation of the exit aperture 304 in relation to its associated asymmetric lens 104 changes. As discussed in more detail with reference to FIG. 11, the asymmetric lens 104 includes a rectangular back surface with a long axis and a short axis. As the angle of rotation of the exit aperture 304 changes, a lateral position of the exit aperture 304 along the long and short axes of the rectangular back surface remains substantially unchanged. For purposes of this application, "substantially unchanged" means unchanged to within manufacturing tolerances.

A motor 308 rotates the light source assembly 303 around the axis of rotation 318. The motor is mechanically coupled to the light source assembly 303 through a system of geared pulleys 313 and 316 and belts 315, 314, and 317. In various embodiments, other mechanical systems may be used to couple the motor 308 to the light source assembly 303 to rotate around the pivot point 319. In some embodiments, the motor 308 is directly attached to the light source assembly 303 at the pivot point 319. In other embodiments, the motor 308 is configured to rotate the light source assembly 303 via a gear system, a cam system, a lever arm system, or other power transfer mechanism.

The motor 308 is further mechanically coupled to a braking system (or brake) 312 by a belt 315. In other embodiments, the motor 308 may be coupled to the braking system 312 via gears or a direct mechanical connection. The braking system 312 is configured to hold the light source assembly 303 in a desired position when a holding current is removed from the motor 308 or when the luminaire 100 is subject to movement or vibration that could move the light source assembly 303 in the desired position.

The motor 308 is also mechanically coupled to a sensor (or sensors) 310 which is configured to detect and report a current position of the motor 308 and, thus, a rotational position of the light source assembly 303. In various embodiments, the motor 308 is mechanically coupled to the shaft of to the sensor 310 by a direct connection or via belts or gears.

The motor 308 may be controlled locally, using the menu and control panel 112, or may be controlled remotely by control signals received via the data connector discussed above from a lighting control desk. Such signals may be sent using a connection protocol such as DMX512, RDM, sACN, Artnet or other communication protocol.

In FIG. 3 the light source assembly 303 is shown in the first position, where optical axes of the light emitters 302 are substantially perpendicular to the rear faces of the asymmetric lenses 104. For purposes of this application, "substantially perpendicular" means an optical axis within +/−10° of perpendicular to the rear face of the asymmetric lens 104. In FIG. 4 the light source assembly 303 is shown in the second position, where the optical axes of the light emitters 302 are tilted toward first ends of the rear faces of asymmetric lenses 104. As discussed in more detail below, in operation, the light source assembly 303 may be continuously adjusted to angles both above and below the substantially perpendicular position shown in FIG. 3.

Figure 5:
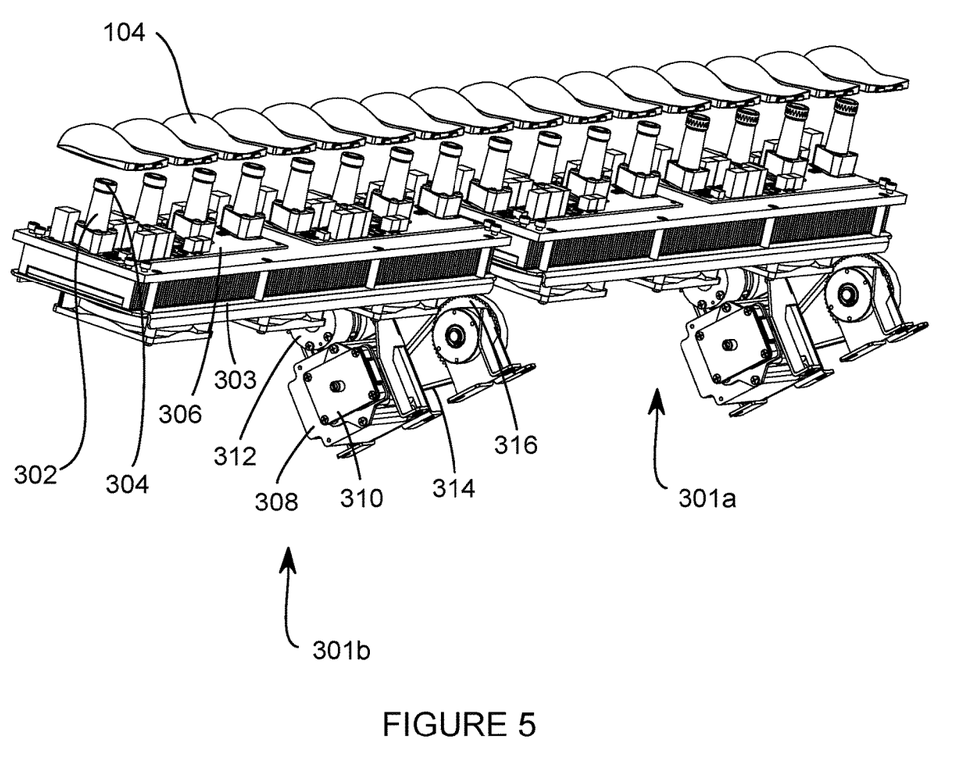
FIG. 5 presents a third orthogonal view of internal components of the luminaire of FIG. 1, with the light source assembly in the first position.

FIG. 5 presents a third orthogonal view of internal components of the luminaire 100 of FIG. 1, with the light source assembly 303 in the first position. The relationship between light emitters 302, exit apertures 304, and asymmetric lenses 104 may be seen more clearly in FIG. 5. Each of the light emitter assemblies 301a and 301b comprises a plurality of light emitters 302 mounted on one or more of the circuit boards 306, which are mounted to an associated light source assembly 303. In the embodiment shown in FIG. 5, four light emitters 302 are mounted on a single circuit board 306 and two circuit boards 306 are mounted to a single light source assembly 303. In various embodiments, luminaires according to the disclosure may contain one light source assembly 303 or three or more light source assemblies 303, each of which may comprise an associated motor 308, an optional brake 312, and/or an optional sensor 310. In luminaires with a plurality of light source assemblies 303, the light source assembly 303 may be physically coupled and rotated together or may be independently rotated. Independently rotatable light source assemblies 303 may be controlled by a user to move together or in any desired pattern of movement.

Figure 6:
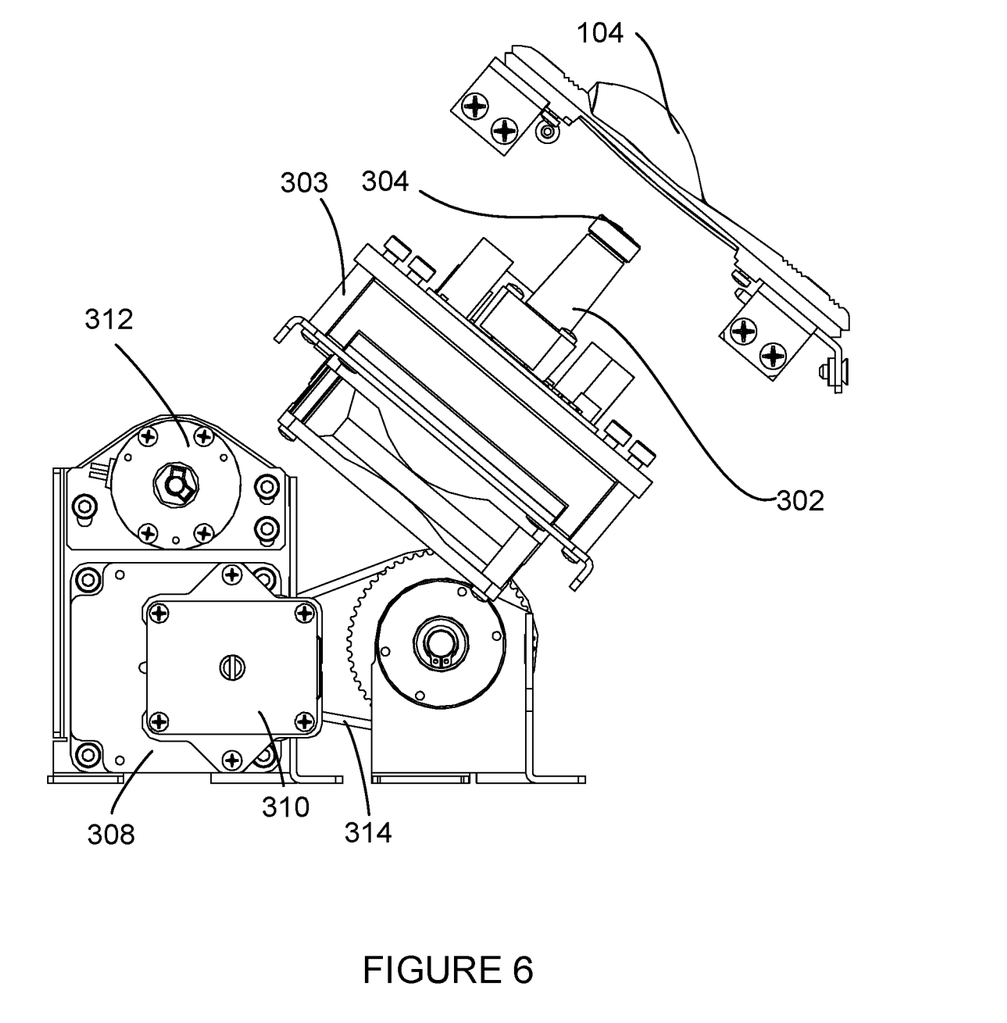
FIGS. 6, 7, and 8 present side elevation views of a first end of the luminaire of FIG. 1, with the light emitter assembly in the first position, the second position, and a third position, respectively.
Figure 7:
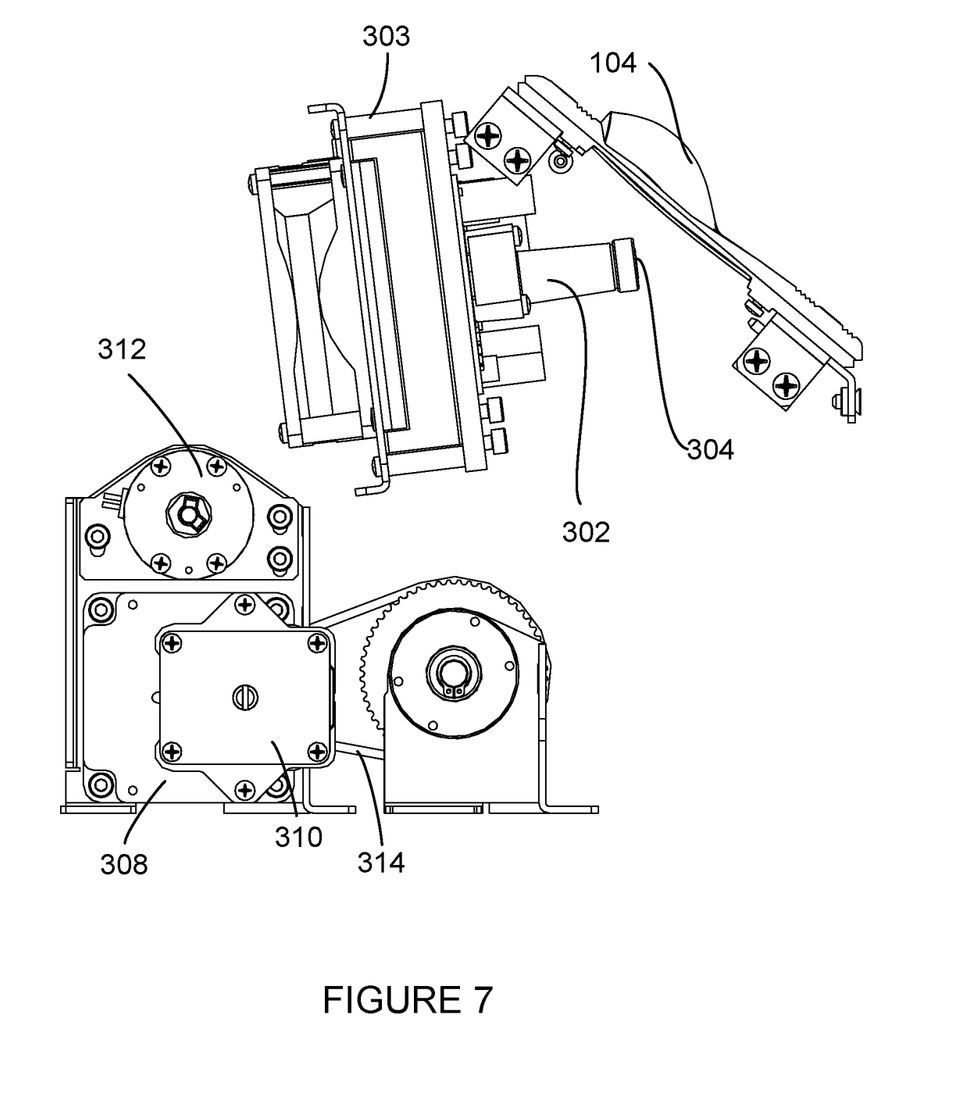
Figure 8:
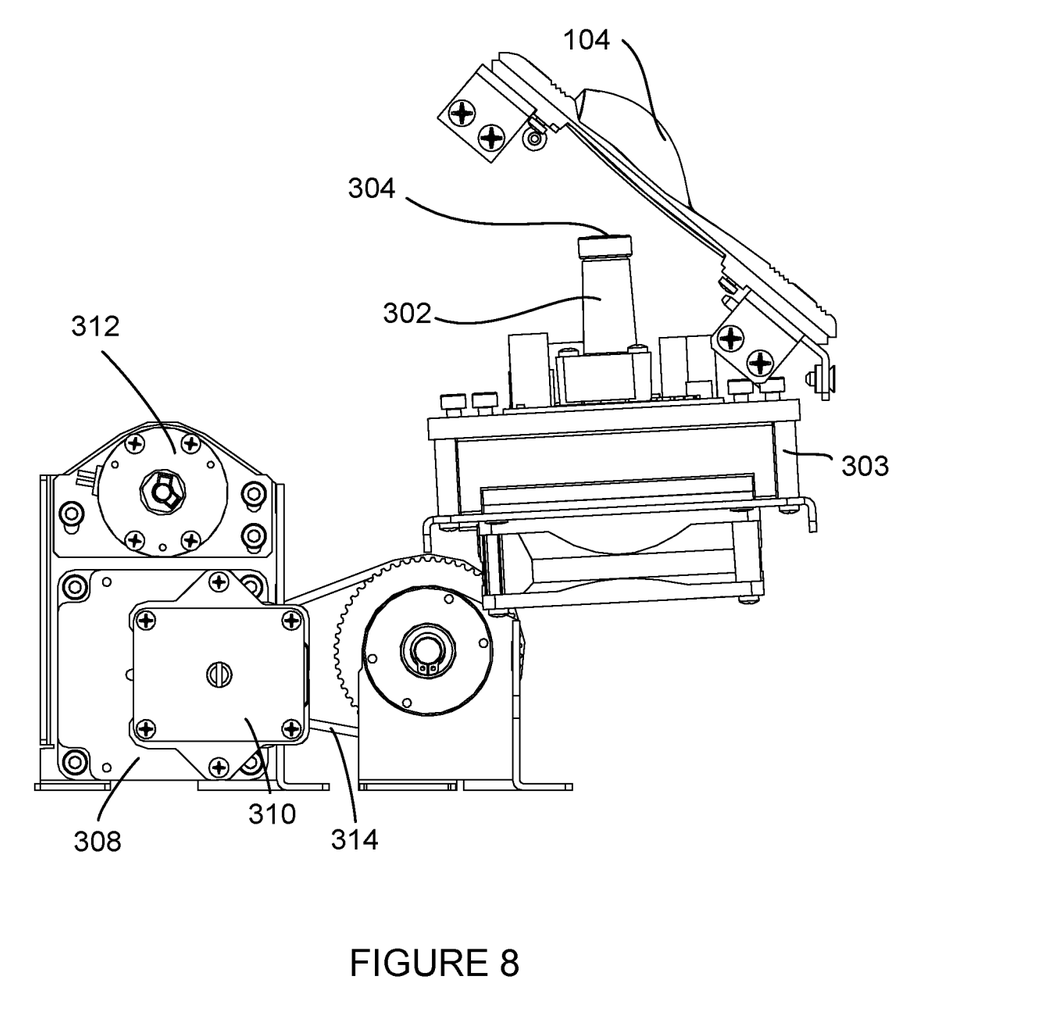

FIGS. 6, 7, and 8 present side elevation views of a first end of the luminaire 100 of FIG. 1, with the light emitter assembly in the first position, the second position, and a third position, respectively. Some elements of the light source assembly 303 are not shown in FIGS. 6, 7, and 8 to more clearly show the positional relationships between the light emitters 302 and the rear faces of the asymmetric lenses 104. In FIG. 6, the light source assembly 303 is shown in the first position, where the optical axes of the light emitters 302 are substantially perpendicular to the rear faces of the asymmetric lenses 104. In FIG. 7 the light source assembly 303 is shown in the second position where the optical axes of the light emitters 302 are tilted toward the first end of the rear faces of asymmetric lenses 104 (in the orientation shown in FIGS. 6, 7, and 8, downward toward the bottom end). In FIG. 8 the light source assembly 303 is shown in the third position where the optical axes of the light emitters 302 are tilted toward a second end of the rear faces of asymmetric lenses 104 (in the orientation shown in FIGS. 6, 7, and 8, upward toward the top end).

In some embodiments, the light source assembly 303 is configured to be adjusted to any angle within a total range extending from 45° above to 45° below the first position. In some such embodiments, the light source assembly 303 may be rotated to and stopped at any angle within the total range.

Figures 9A, 9B, 9C:
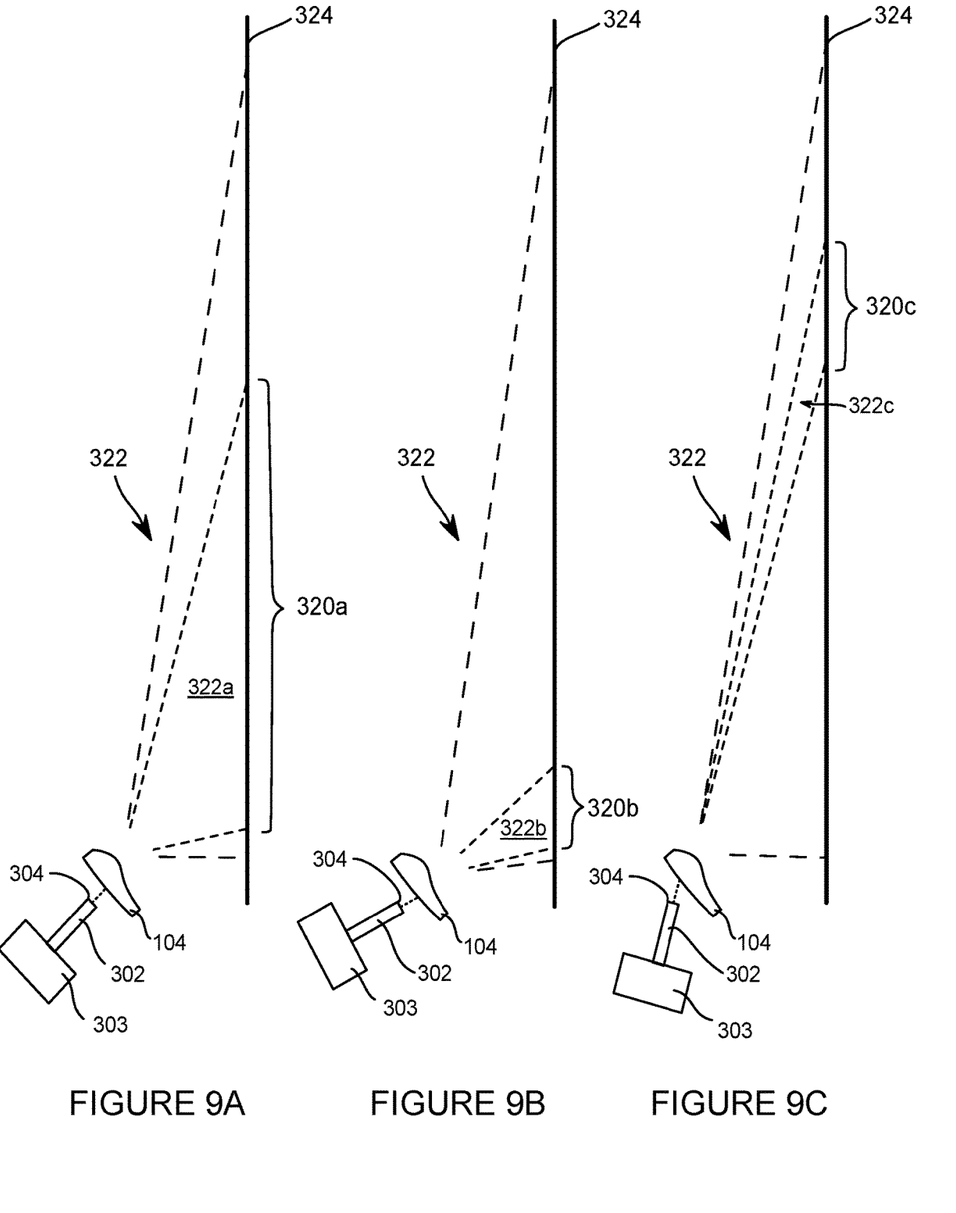
FIGS. 9A, 9B, and 9C present side elevation schematic representations of light output of the asymmetric lens of FIG. 1.

FIGS. 9A, 9B, and 9C present side elevation schematic representations of light output of the asymmetric lens 104 of FIG. 1. The asymmetric lens 104 emits a projected beam 322, having light distribution patterns (or distributions) 322a, 322b, and 322c in FIGS. 9A-9C, respectively In FIGS. 9A-9C, the light source assembly 303 is in the first, second, and third positions, respectively. Long-dash lines in FIGS. 9A-9C indicate an extent of a "field" angle of the projected beam 322. Within the field angle, the beam intensity is greater than 10% brightness. Short-dash lines indicate an extent of a "beam" angle of the projected beam 322. Within the beam angle, the beam intensity is greater than 50% brightness.

As discussed in more detail with reference to FIG. 11, the asymmetric lens 104 has a long axis 408 and a short axis 410. A long axis and a short axis of the projected beam 322 are parallel to the long axis 408 and the short axis 410 of the asymmetric lens 104. The axis of rotation 318 (discussed with reference to FIG. 3) is parallel to the short axis 410. As the light source assembly 303 and the light emitter 302 rotate around the axis of rotation 318, the optical axis of the light emitter 302 moves in a plane that is perpendicular to the asymmetric lens 104 and that passes through the long axis 408.

As the light source assembly 303 and the light emitter 302 rotate around the axis of rotation 318, a distance of the exit aperture 304 from the asymmetric lens 104 and a lateral position of the exit aperture 304 along the long and short axes of the asymmetric lens 104 remain substantially unchanged. As the light source assembly 303 and the light emitter 302 rotate, (i) the angle of the optical axis of the light emitter 302 relative to the asymmetric lens 104 changes and (ii) a point of entry of a light beam emitted by the light emitter 302 into the asymmetric lens 104 moves along the long axis 408.

In FIGS. 9A-9C, a dotted line schematically indicates the angle of the optical axis of the light emitter 302 relative to the asymmetric lens 104 and a location along the long axis 408 of the point of entry of the light beam emitted by the light emitter 302 into the asymmetric lens 104. FIGS. 9A, 9B, and 9C present the distributions 322a, 322b, and 322c, respectively, along the long axis of the projected beam 322. A first end of the projected beam 322 (as discussed with reference to FIG. 9B) and a second end of the projected beam 322 (as discussed with reference to FIG. 9C) are two ends of the long axis of the projected beam 322.

In FIG. 9A, the light source assembly 303 is shown in the first position, where the optical axis of the light emitter 302 is oriented at a first angle to the rear face of the asymmetric lens 104. A light beam from the light emitter 302 enters the asymmetric lens 104 at a first point of entry, located in a central portion of the rear face of the asymmetric lens 104. When a light beam from the light emitter 302 enters the asymmetric lens 104 at the first point of entry, the asymmetric lens 104 projects the projected beam 322 with the distribution 322a onto the surface 324. The distribution 322a comprises a large hot-spot that is located in a central position along the long axis of the distribution 322a. When the distribution 322a illuminates the surface 324, the hot-spot illuminates a region 320a of the surface 324. As discussed below with reference to FIG. 10A, the hot-spot may appear to a viewer of the surface 324 as a region of even illumination extending horizontally across the surface 324 and extending along the long axis of the distribution 322a over much of a central portion of the surface 324.

In FIG. 9B the light source assembly 303 is shown in the second position, where the optical axis of the light emitter 302 is oriented at a second angle to the rear face of the asymmetric lens 104. The light beam from the light emitter 302 enters the asymmetric lens 104 at a second point of entry, nearer to the bottom of the rear face of the asymmetric lens 104 than the first point of entry. When a light beam from the light emitter 302 enters the asymmetric lens 104 at the second point of entry, the asymmetric lens 104 projects the projected beam 322 with the distribution 322b onto the surface 324.

The distribution 322b comprises a hot-spot that is smaller along the long axis than the hot-spot of the distribution 322a and is located in a portion of the distribution 322b that is closer to a first end of the long axis of the distribution 322b. As discussed below with reference to FIG. 10B, the hot-spot may appear to the viewer as a band of light extending horizontally across a lower portion of the surface 324.

As the angle of the light source assembly 303 changes progressively from the second position to the first position, the point of entry of the light beam correspondingly moves progressively from the second point of entry to the first point of entry, the hot-spot size correspondingly increases progressively along the long axis of the projected beam 322, and correspondingly moves progressively up the surface 324 to become, with the light source assembly 303 in the first position, the region 320a, as shown in FIG. 9A.

In FIG. 9C the light source assembly 303 is shown in the third position, where the optical axis of the light emitter 302 is oriented at a third angle to the rear face of the asymmetric lens 104. The light beam from the light emitter 302 enters the asymmetric lens 104 at a third point of entry, nearer to the top of the rear face of the asymmetric lens 104 than the first point of entry. When the light beam from the light emitter 302 enters the asymmetric lens 104 at the third point of entry, the asymmetric lens 104 projects the projected beam 322 with the distribution 322c onto the surface 324

The distribution 322c comprises a hot-spot that is smaller along the long axis than the hot-spot of the distribution 322a and is located in a portion of the distribution 322c that is closer to a second end of the long axis of the distribution 322c. As discussed below with reference to FIG. 10C, the hot-spot may appear to the viewer as a band of light extending horizontally across an upper portion of the surface 324.

As the angle of the light source assembly 303 changes progressively from the third position to the first position, the point of entry of the light beam correspondingly moves progressively from the third point of entry to the first point of entry, the hot-spot size correspondingly increases progressively along the long axis of the distribution 322a, and correspondingly moves progressively down the surface 324 to become, with the light source assembly 303 in the first position, the region 320a, as shown in FIG. 9A.

Thus, the asymmetric lens 104 is configured to project a beam onto the surface 324 having a hot-spot with a size and position that is controlled by the angle between the optical axis of the light emitter 302 and the asymmetric lens 104. Such changing size and movement of the hot-spot can be used by the operator as a special lighting effect or to adjust the uniformity, width, position, or other characteristic of the illumination of the surface 324. Such changing size and movement of the hot-spot may also be used to correct for differences in the distance of the luminaire 100 from the surface 324.

Figure 10A:
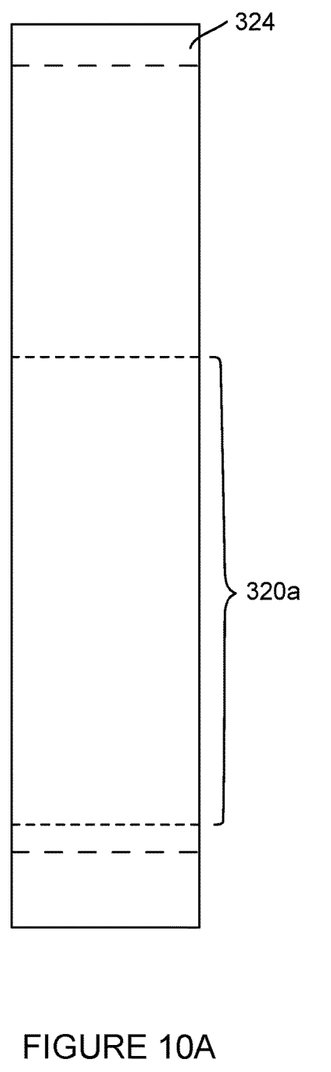
FIGS. 10A, 10B, and 10C present front elevation schematic representations of the light output of the asymmetric lens of FIG. 1.
Figure 10B:
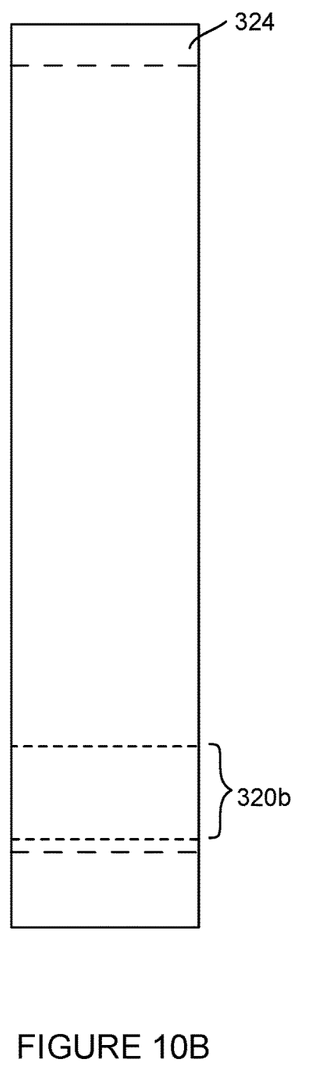
Figure 10C:
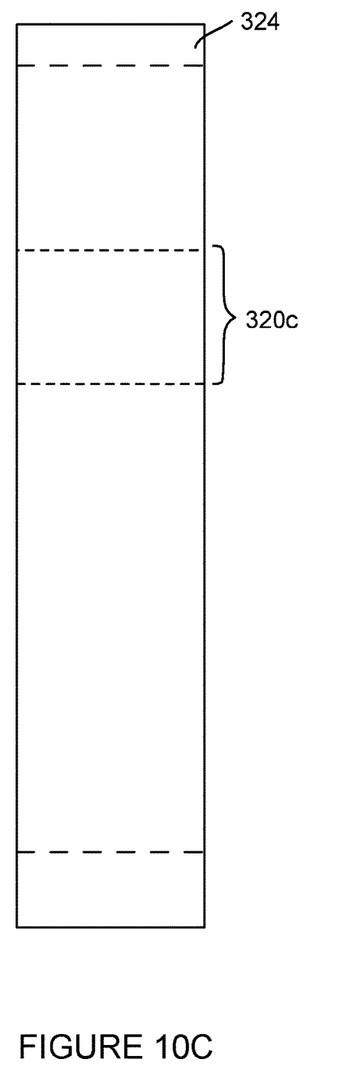

FIGS. 10A, 10B, and 10C present front elevation schematic representations of the light output of the asymmetric lens 104 of FIG. 1. In FIGS. 10A-10C, the light source assembly 303 is in the first, second, and third positions, respectively. Solid rectangles in FIGS. 10A-10C represent a portion of the surface 324, long-dashed lines indicate edges of the field angle of the projected beam 322 and short-dashed lines represent edges of the beam angle (the hot-spot) of the projected beam 322. While the horizontal extent of the light projected by the luminaire 100 is shown in FIGS. 10A-10C as covering the entire width of the surface 324, in various applications, the light emitted from the luminaire 100 may extend past the sides of the surface 324, or may not extend fully across the surface 324.

In FIG. 10A, the light source assembly 303 is in the first position, corresponding to FIG. 9A. In the first position, the illumination of the surface 324 by the projected beam 322 with the distribution 322a includes the wide region 320a, presenting the effect of a visually flat (or even) illumination of the surface 324 in the region 320a.

The asymmetric lenses 104 are configured to project a light beam that is substantially rectangular in shape, rather than a trapezoidal beam as projected by conventional symmetrical lenses. The light beam has a long axis and a short axis. For purposes of this application, "substantially rectangular" means an angle of the long edges of the field angle of the light beam relative to the long axis of the light beam is less than 15°.

A brightness profile along the long axis of the light beam projected by the asymmetric lenses 104 varies from brighter in regions of the light beam that fall on portions of the surface 324 that are farther or more distant from the asymmetric lenses 104 (e.g., toward the top of the surface 324 in FIG. 10A) to less bright in regions of the light beam that fall on portions of the surface 324 that are nearer or closer to the asymmetric lenses 104 (e.g., toward the bottom of the surface 324 in FIG. 10A). That is, the light beam has a brightness profile that varies from less bright at a first end of the long axis of the light beam to brighter at a second end of the long axis of the light beam. Such a light distribution compensates for the differences in throw distance from the luminaire 100 to the farther top portion of the surface 324 and to the nearer bottom portion of the surface 324, resulting in a more equal (or even) illumination level on the surface 324 along long axis of the light beam.

In FIG. 10B, the light source assembly 303 is in the second position, corresponding to FIG. 9B. In the second position, the illumination of the surface 324 by the projected beam 322 with the distribution 322b includes the narrow region 320b of at least 50% brightness. As can be seen in FIG. 10B, the region 320b appears to the viewer as a band of light extending across a first end of the surface 324 that is closer to the asymmetric lenses 104. As described with reference to FIG. 9B, as the angle of the light source assembly 303 is adjusted progressively from the second position to the first position, the region 320b progressively moves and widens along the long axis of the distribution 322b (and vice versa as the light source assembly 303 is adjusted progressively from the first position to the second position).

In FIG. 10C, the light source assembly 303 is in the third position, corresponding to FIG. 9C. In the third position, the illumination of the surface 324 by the projected beam 322 with the distribution 322c includes the narrow region 320c of at least 50% brightness. As can be seen in FIG. 10C, the region 320c appears to the viewer as a band of light extending across a second end of the surface 324 that is farther from to the asymmetric lenses 104. As described with reference to FIG. 9C, as the angle of the light source assembly 303 is adjusted progressively from the third position to the first position, the region 320c progressively moves and widens along the long axis of the distribution 322c (and vice versa as the light source assembly 303 is adjusted from the first position to the third position).

Figure 11:
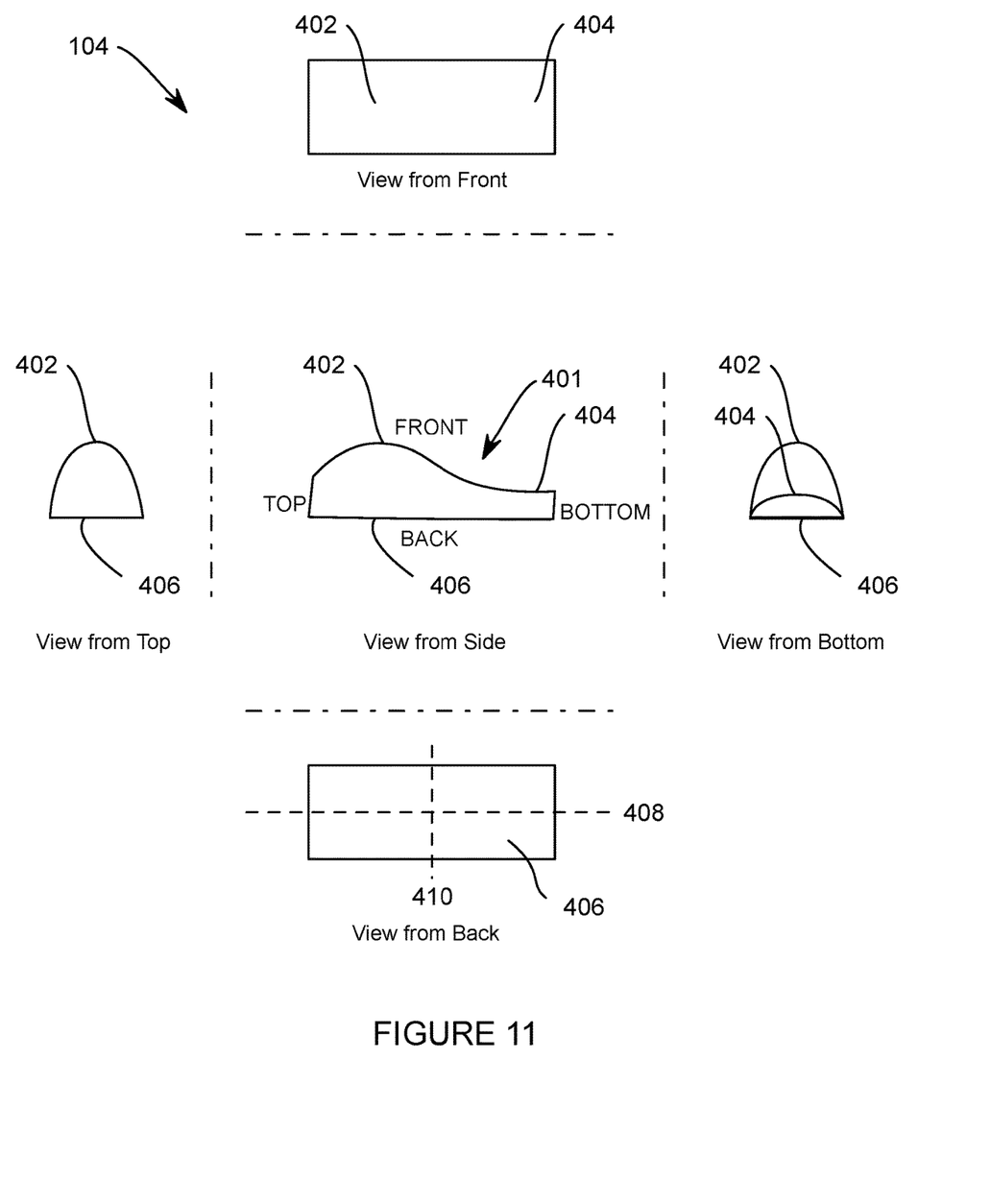
FIG. 11 presents elevation views of the asymmetric lens of FIG. 1.

FIG. 11 presents elevation views of the asymmetric lens 104 of FIG. 1. The asymmetric lens 104 comprises a long axis 408 and a short axis 410. The long and short axes of the projected beam 322 discussed above are parallel, respectively, to the long axis 408 and the short axis 410 of the asymmetric lens 104.

A back surface 406 of the asymmetric lens 104 is rectangular. In various embodiments, the back surface 406 may be planar or may have a convex or concave surface with a large radius. Such a non-planar back surface may be symmetric or asymmetric.

An asymmetric surface 401 of the asymmetric lens 104 is on an opposite side of the asymmetric lens 104 to the back surface 406. The asymmetric surface 401 comprises long and short axes that are parallel, respectively, to the long axis 408 and the short axis 410 of the asymmetric lens 104. The asymmetric surface is asymmetric in a cross-section taken in a plane perpendicular to the short axis of the asymmetric lens. The asymmetric surface has a region 402 at a top end (corresponding to the second end of the rear face referred to in the discussion of FIG. 8) and a region 404 at a bottom end (corresponding to the first end of the rear face referred to in the discussion of FIG. 7).

The region 402 comprises convex curvatures having radii of curvature that are deeply convex (or short-radius) in cross-sections taken in planes perpendicular to the long axis and the short axis of the asymmetric lens 104. In a cross-section taken in a plane perpendicular to the short axis of the asymmetric lens 104, the region 404 is concave, but may be flat or convex in other embodiments. In a first cross-section taken in a plane perpendicular to the long axis of the asymmetric lens 104, the region 404 is convex and has a first radius of curvature. In a second cross-section taken in a plane perpendicular to the long axis of the asymmetric lens 104, the region 402 is convex and has a second radius of curvature. The second radius of curvature is shorter than the first radius of curvature. The region 402 is configured to have a higher optical power than the region 404 and to more strongly converge light from the associated light emitter 302 than the region 404. The region 404 is configured to have a lower optical power than the region 402 and to less strongly converge light from the associated light emitter 302 than the region 402. The optical power of the asymmetric lens 104 varies smoothly between the lower optical power of the region 404 and the higher optical power of the region 402. Curved surfaces of the asymmetric lens 104 may be spherical or aspheric surfaces or a combination thereof.

As may be seen in FIG. 1, when the luminaire 100 is supported by its feet 102, the asymmetric lenses 104 of the luminaire 100 are mounted with their top and bottom ends nearer to a top side and the bottom side of the luminaire 100, respectively. When the luminaire 100 is positioned near the lower portion of the surface 324, the asymmetric lenses 104 positioned with their bottom and top ends nearer to the first and second ends of the surface 324, respectively. As may be seen in FIGS. 9A-9C, in the second position the point of entry of the light beam emitted by the light emitter 302 is closer to the bottom (i.e., first) end of the asymmetric lens 104 than in the first position. In the third position, the point of entry of the light beam emitted by the light emitter 302 is closer to the top (i.e., second) end of the asymmetric lens 104 than in the first position.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire comprising:
a light emitter comprising an exit aperture and configured to emit a light beam having an optical axis;
an asymmetric lens configured to receive the light beam and emit a projected beam; and
a motor mechanically coupled to the light emitter and configured to rotate the light emitter about an axis of rotation passing through the exit aperture, thereby moving a point of entry of the light beam into the asymmetric lens,
wherein a size and location of a hot-spot of the projected beam varies as the point of entry of the light beam into the asymmetric lens moves.

2. The luminaire of claim 1, wherein:
the asymmetric lens comprises a long axis and a short axis;
the asymmetric lens comprises a back surface configured to receive the light beam; and
the motor is configured move the point of entry along the long axis of the asymmetric lens.

3. The luminaire of claim 2, wherein the axis of rotation is parallel to the short axis of the asymmetric lens.

4. The luminaire of claim 3, wherein a distance of the exit aperture from the back surface remains substantially unchanged as the motor rotates the light emitter about the axis of rotation.

5. The luminaire of claim 4, wherein the projected beam comprises a long axis and a short axis that are parallel to the long axis and the short axis of the asymmetric lens, respectively.

6. The luminaire of claim 5, wherein the projected beam is substantially rectangular in shape.

7. The luminaire of claim 5, wherein:
the long axis of the projected beam comprises a first end and a second end; and
a brightness profile along the long axis of the projected beam varies from less bright at the first end of the long axis to brighter at the second end of the long axis.

8. The luminaire of claim 7, wherein:
the back surface comprises a first end and a second end corresponding, respectively, to the first and second ends of the long axis of the projected beam; and
the asymmetric lens is configured such that:
for a light beam entering the back surface of the asymmetric lens at a first point of entry located in a central portion of the back surface, the projected beam comprises a first hot-spot (i) located in a central portion of the projected beam and (ii) having a first size;
for a light beam entering the back surface of the asymmetric lens at a second point of entry located nearer to the first end of the back surface than the first point of entry, the projected beam comprises a second hot-spot (i) located closer to the first end of the projected beam than the first hot-spot and (ii) having a second size that is smaller than the first size; and
for a light beam entering the back surface of the asymmetric lens at a third point of entry of the light beam located nearer to the second end of the back surface than the first point of entry, the projected beam comprises a third hot-spot (i) located closer to the second end of the projected beam than the first hot-spot and (ii) having a third size that is smaller than the first size.

9. The luminaire of claim 8, wherein the asymmetric lens is configured such that, as the point of entry of the light beam into the back surface progressively moves from the second point of entry to the first point of entry, the hot-spot of the projected beam (i) progressively moves toward the central portion of the projected beam and (ii) progressively increases in size from the second size to the first size.

10. The luminaire of claim 8, wherein:

the asymmetric lens comprises an asymmetric surface on a side of the asymmetric lens opposite to the back surface; and the asymmetric surface is asymmetric in a cross-section taken in a plane perpendicular to the short axis of the asymmetric lens and symmetric in a cross-section taken in a plane perpendicular to the long axis of the asymmetric lens.

11. The luminaire of claim 10, wherein:

the asymmetric surface comprises first and second ends corresponding to the first and second ends of the back surface; and a radius of curvature of the asymmetric surface in a cross-section taken in a plane perpendicular to the long axis of the asymmetric lens at the first end of the asymmetric surface is larger than a radius of curvature of the asymmetric surface in a cross-section taken in a plane perpendicular to the long axis of the asymmetric lens at the second end of the asymmetric surface.

12. The luminaire of claim 7, wherein:

the light emitter is a first light emitter of a plurality of light emitters;

the asymmetric lens is a first asymmetric lens of a corresponding plurality of asymmetric lenses; and the motor is configured to rotate the plurality of light emitters.

13. The luminaire of claim 12, wherein:

the luminaire comprises an elongated housing having a long axis; and the asymmetric lenses are arranged in a single row extending in a direction of the long axis of the elongated housing.

14. The luminaire of claim 12, wherein the asymmetric lenses are arranged adjacent to each other.

15. An asymmetric lens comprising:

a long axis and a short axis; and an asymmetric surface comprising a long axis parallel to the long axis of the asymmetric lens, wherein the asymmetric surface is asymmetric in a cross-section taken in a plane perpendicular to the short axis of the asymmetric lens, wherein a first region of the asymmetric lens at a first end of the long axis of the asymmetric surface has a first optical power;

a second region at a second end of the long axis of the asymmetric surface has a second optical power, the second optical power being greater than the first optical power; and an optical power of the asymmetric lens varies smoothly between the first optical power and the second optical power, wherein the asymmetric lens is configured to:

receive a light beam and emit a projected beam;

the projected beam comprises a long axis and a short axis that are parallel to the long axis and the short axis of the asymmetric lens, respectively; and the projected beam comprises a brightness profile along the long axis of the projected beam that varies from less bright at a first end to brighter at a second end, wherein the projected beam comprises a hot-spot having a size and a location along the long axis of the projected beam, where the size and the location are determined by a location of a point of entry of the light beam into the asymmetric lens along the long axis of the asymmetric lens.

16. The asymmetric lens of claim 15, wherein:

the cross-section is a first cross-section;

the asymmetric surface further comprises a short axis parallel to the short axis of the asymmetric lens;

the first region comprises a first convex curvature having a first radius in a second cross-section taken in a plane perpendicular to the long axis of the asymmetric lens;

the second region comprises a second convex curvature having a second radius in a third cross-section taken in a plane perpendicular to the long axis of the asymmetric lens; and the second radius is shorter than the first radius.

17. The asymmetric lens of claim 15, wherein the projected beam is substantially rectangular in shape.

18. The asymmetric lens of claim 15, wherein:

the asymmetric lens comprises a first end and a second end corresponding to the first and second ends, respectively, of the long axis of the projected beam; and the asymmetric lens is configured such that:

for a light beam entering the asymmetric lens at a first point of entry located in a central portion of the asymmetric lens, the projected beam comprises a first hot-spot (i) located in a central portion of the projected beam and (ii) having a first size;

for a light beam entering the asymmetric lens at a second point of entry located nearer to the first end of the asymmetric lens than the first point of entry, the projected beam comprises a second hot-spot (i) located closer to the first end of the projected beam than the first hot-spot and (ii) having a second size that is smaller than the first size; and for a light beam entering the asymmetric lens at a third point of entry located nearer to the second end of the asymmetric lens than the first point of entry, the projected beam comprises a third hot-spot (i) located closer to the second end of the projected beam than the first hot-spot and (ii) having a third size that is smaller than the first size.

19. The asymmetric lens of claim 18, wherein the asymmetric lens is configured such that, as the point of entry of the light beam into the asymmetric lens moves progressively from the second point of entry to the first point of entry, the hot-spot of the projected beam (i) progressively moves toward the central portion of the projected beam and (ii) progressively increases in size from the second size to the first size.

* * * * *